United States Patent [19]

Cook

[11] Patent Number: 4,601,080

[45] Date of Patent: Jul. 22, 1986

[54] WASHING APPARATUS

[76] Inventor: Terrence E. Cook, NW. 440 North St., Pullman, Wash. 99163

[21] Appl. No.: 728,574

[22] Filed: Apr. 29, 1985

[51] Int. Cl.$^4$ ............................................. A23N 12/00
[52] U.S. Cl. ..................................... 15/3.12; 15/3.11
[58] Field of Search ..................... 15/3.1, 3.11, 3.12, 15/3.13, 3.14, 3.16, 21 A, 90

[56] References Cited

U.S. PATENT DOCUMENTS

| | | |
|---|---|---|
| 23,385 | 3/1859 | Mosher et al. . |
| 100,639 | 3/1870 | Keating . |
| 104,123 | 6/1870 | Derham . |
| 166,847 | 8/1875 | Caylor . |
| 1,161,963 | 11/1915 | Pebley ................... 15/3.11 |
| 1,633,803 | 6/1925 | Ballin . |
| 1,914,016 | 6/1932 | Hobi . |
| 2,287,014 | 6/1942 | Allan . |
| 2,519,259 | 8/1950 | Liebman . |
| 3,784,996 | 1/1974 | Ambrose . |
| 3,802,448 | 4/1974 | Bell . |
| 3,815,615 | 6/1974 | Holm . |
| 3,949,443 | 4/1976 | Edgar . |
| 3,952,757 | 4/1976 | Huey . |
| 4,142,541 | 3/1979 | Bossert et al. . |
| 4,311,158 | 1/1982 | Harvey . |
| 4,317,426 | 2/1982 | Wheten . |
| 4,353,381 | 10/1982 | Winters . |

*Primary Examiner*—Edward L. Roberts
*Attorney, Agent, or Firm*—Wells, St. John & Roberts

[57] ABSTRACT

An apparatus for tumbling and cleaning articles such as rocks, clams, potatoes, other vegetables and fruits, and the like. The apparatus has a frame with a container mounted for free rotation thereon. The container has perimetric surfaces with numerous openings therethrough for allowing an impinging jet of water or other liquid to wash the articles and carry dirt away. Fins are advantageously provided about the container for engaging the jet of liquid to thereby rotate the container so that articles being cleaned are tumbled therein. Brushing devices are included within the container to aid in removal of soil from the articles as they tumble against the brushes.

15 Claims, 4 Drawing Figures

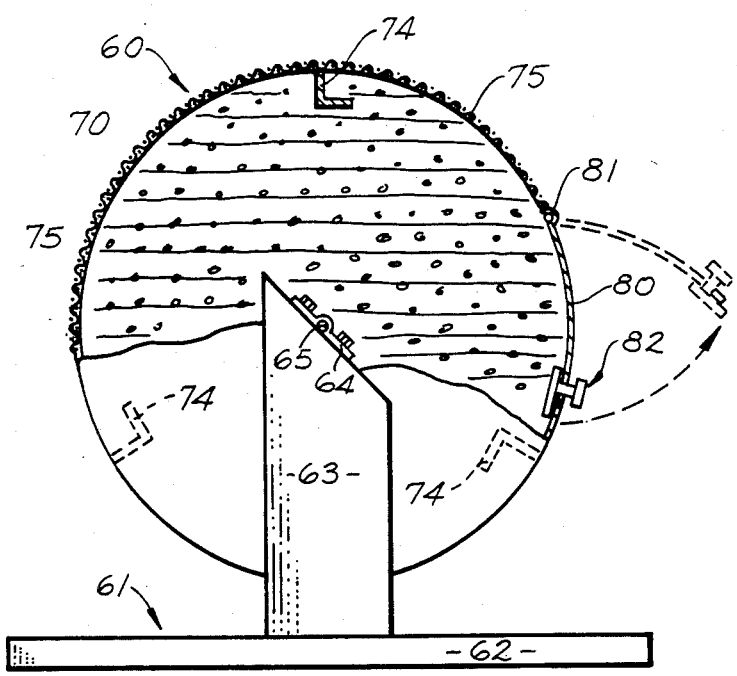
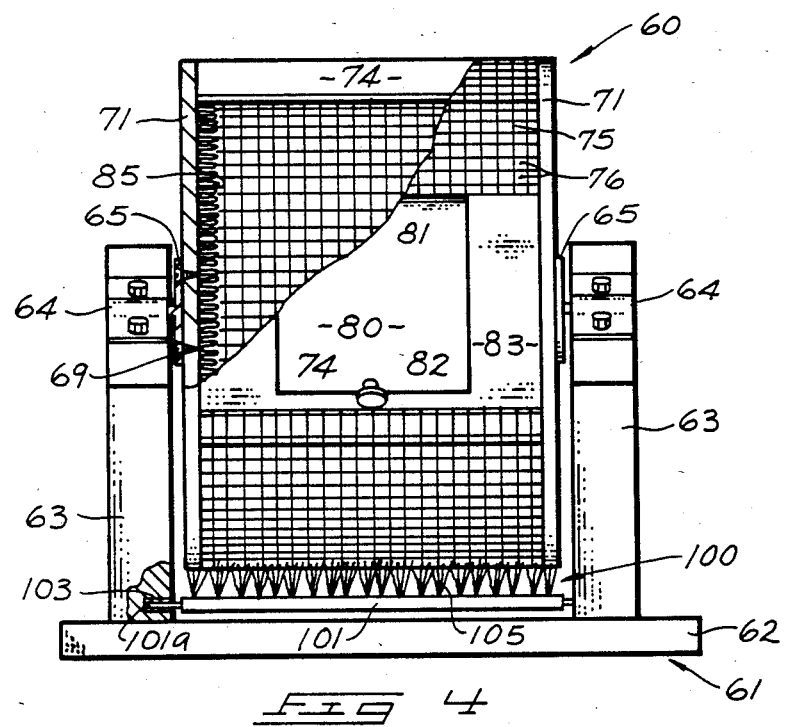

WASHING APPARATUS

TECHNICAL FIELD

The technical field of this invention is apparatus for containing, tumbling, and cleaning articles using an externally applied jet of liquid.

BACKGROUND

Gardeners, clam diggers, rock hounds, and many other types of persons are often in need of an apparatus for conveniently washing mud, sand, and other debris from surfaces of articles such as potatoes, carrots, clams, rocks and others. The present invention includes apparatus for doing so in a convenient manner using a jet of impinging water or other suitable liquid.

BRIEF DESCRIPTION OF THE DRAWINGS

The invention is illustrated in the accompanying drawings, in which:

FIG. 3 is a side elevational view, partially in cross section, of an alternative preferred embodiment washing apparatus according to this invention; and FIG. 4 is a front elevational view of the washing apparatus of FIG. 3.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Figure 1:
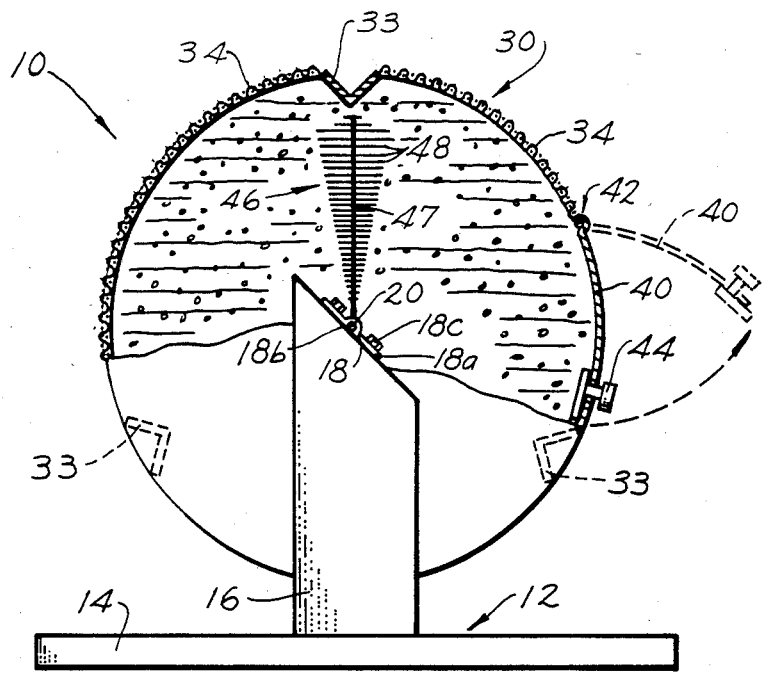
FIG. 1 is a side elevational view, partially in cross section, of a preferred embodiment washing apparatus according to this invention.
Figure 2:
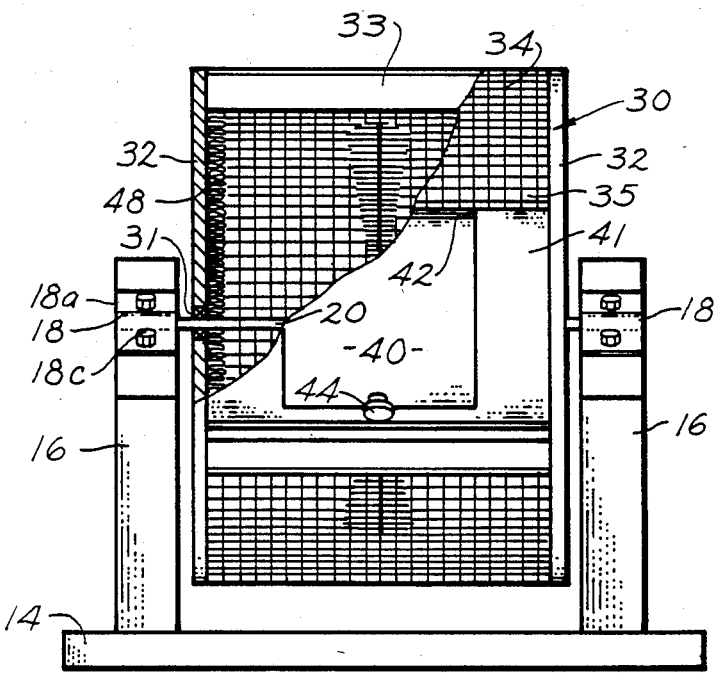
FIG. 2 is a front elevational view, partially in cross section, of the washing apparatus of FIG. 1.

FIGS. 1 and 2 show a washing apparatus 10 of this invention. Washing apparatus 10 has a frame 12 which includes a base plate 14, upright stanchions 16, and shaft mounts 18. Frame 12 may also be defined to include a shaft 20 which extends between stanchions 16 and is advantageously mounted rigidly thereto by shaft mounts 18.

Shaft mounts 18 can be of a variety of types with those shown in FIGS. 1 and 2 comprising a mount plate 18a having a recess 18b for receiving and holding shaft 20 therein. Fasteners 18c extend through apertures in mount plate 18a and are secured in stanchions 16.

Washing apparatus 10 further includes a container 30 which is mounted for free rotation upon shaft 20 using journals or other bearing means 31 at each side of container 30. Container 30 includes end plates 32 which are advantageously fixed relative to each other in spaced parallel positions using fins 33. Ends plates 32 can be circular, octagonal, or other polygonal or alternative shapes as necessary to allow tumbling action within the container.

Container 30 further comprises perimetric or circumferential surfaces 34 which also extend between end plates 32 about the perimeter or circumference of the container so as to form an enclosure. Circumferential surfaces 34 can also provide structural support between end plates 32. Circumferential surfaces 34 are advantageously constructed of screen, wire cloth, perforated metal or plastic or similar materials having a plurality of openings 35 existing at circumferential positions about the container through which a jet of impinging liquid, such as water, can reach articles being washed therewithin. Openings 35 further allow the washing liquid to carry dirt, oil and other debris from the interior volume of container 30 on a continuous basis. Circumferential surfaces 34 can also advantageously provide scrubbing action when constructed of appropriate materials such as screen, wire cloth and many other materials and can further be provided with scrubbing surfaces (not shown) such as described below for end plates 32.

Container 30 is provided with an access door 40 through which articles to be washed can be placed inside the container. Access door 40 is pivotally mounted to a relatively rigid portion of circumferential surfaces 34 such as a curved plate 41 using pivot or hinge 42. Pivot 42 allows access door 40 to pivot between a closed position shown in FIGS. 1 and 2 and open positions such as shown in phantom in FIG. 1. Access door 40 is preferably provided with a suitable catch 44 for controllably securing the access door in the closed position.

Washing apparatus 10 is provided with a plurality of fins 33, preferably three or more in number. Fins 33 not only provide structural support but more importantly provide surfaces upon which a jet of externally applied liquid impinge thereby causing container 30 to rotate about shaft 20. Fins 33 can be of a variety of sizes, shapes and orientations as found desirable for the particular service to which the particular washing apparatus is employed. Fins 33 are advantageously constructed with angle pieces as shown in FIG. 1, oriented with the distal ends of the two legs adjacent the peripheral surfaces 34 and secured adjacent thereto to prevent loss of articles positioned within the interior volume of container 30. Circumferential screen surfaces 34 extend between fins 33 and plate 41.

Washing apparatus 10 is provided with brushing surfaces within the interior of container 30 to brush and scrub articles tumbling therewithin. Static brushes 46 are advantageously two or more in number and can be mounted to the stationary shaft 20 in any desired orientation. Static brushes 46 can be constructed in a variety of manners well known in the art of brush making and similar art of cleaning utensils. Static brushes 46 are advantageously provided with brush stems 47 which are screwed or otherwise mount in or to shaft 20. A plurality of flexible fibers or bristles 48 are mounted to brush stems 47 and extend outwardly to brush the articles being cleaned as they tumble and fly about within container 30 as it rotates.

Further brushing means can be provided within container 30 such as brushing surfaces 48 mounted along all or portions of interior surfaces of end plates 32. Brushing surfaces 48 rotate with container 30 thereby providing a different scrubbing action from that performed by static brushes 46. Brushing surfaces 48 can be constructed of a collection of fiber or bristles. Alternatively, waterproof carpeting or similar mats of fibers adhered or otherwise affixed to the interior of end plates 32 can also be used.

It will be readily apparent to those of ordinary skill in the art that other types of static and dynamic brushing means can be mounted within the interior volume of container 30 such as at limited points about the interior of peripheral surfaces 34. Such alternatives are clearly within the invention.

FIGS. 3 and 4 show an alternative washing apparatus 60 according to this invention. Washing apparatus 60 includes a frame 61 similar to frame 12 having a base plate 62 and stanchions 63. Frame 61 further includes bearing means 64 mounted atop stanchions 63 to rotatably support trunions 65 therein. Trunions 65 are rigidly mounted to a container 70 using fasteners 69.

Washing apparatus 60 includes container 70 which has spaced parallel end plates 71. End plates 71 are connected together by suitable structural pieces such as fins 74. End plates 71 are also advantageously connected together by peripheral surfaces such as heavy wire screen 75 having numerous peripheral openings 76 through which liquid enters container 70 to clean articles therein, and through which liquid leaves container 70 taking soil and other debris therewith. Openings 76 further allow a jet of liquid to impinge upon fins 74 to thereby rotate container 70 upon frame 62.

Fins 74 are advantageously mounted within container 70 adjacent to peripheral surfaces 75 and associated openings 76. Fins 74 can advantageously be made of suitably shaped pieces such as the angular pieces shown in FIG. 3, or other various alternatives.

Container 70 is further provided with an access door 80 through which articles can be inserted therein and removed therefrom. Access door 80 is similar in construction to access door 40 shown in FIGS. 1 and 2 and includes a hinge 81, a catch 82 and access door mounting plate 83. Access door 80 is movable between a closed position shown in FIGS. 3 and 4 in solid lines, and open positions as shown in phantom in FIG. 3. Catch 82 is used to secure door 80 in the closed position.

The interior of container 70 is provided with brushing means such as brushing surfaces 85. Brushing surfaces 85 are constructed in any suitable fashion such as described for brushing surfaces 48 above. Brushing means 85 move rotationally with container 70 as it rotates in bearings 64. Articles tumbling within container 70 rub against brushing means 85 and are thereby scrubbed and cleaned in combination with a jet of impinging liquid.

Washing apparatus 60 can further advantageously be provided with a stationary exterior brushing means such as shown in FIG. 4 by reference numeral 100. Exterior brush 100 comprises a rod 101 which is supported between stanchions 63. The ends of rod 101 can be formed with cylindrical journal sections 101a which are firmly but yieldably supported in stanchion apertures 103. This mounting of rod 101 allows the upstanding fibers or brushes 105 to rotate if excessive resistance is met. Brushes 105 can be of any suitable type as described above, known in the art, or hereafter developed.

The manner of using washing apparatus 10 and 60 will now be explained. Articles to be washed, scrubbed and cleansed are placed in containers 30 and 70 using access doors 40 and 80, respectively. Access doors 40 and 80 are then secured closed using catches 44 and 82, respectively. A jet of water, suitable solvent, or other liquid is then directed at containers 30 and 70 thereby causing them to rotate under the force of the impinging liquid. The rotating containers 30 and 70 cause articles being cleaned therein to tumble and scrub upon the scrubbing means 46, 49 and 85 mounted staticly and dynamically within the interiors thereof. Peripheral surfaces 34 and 75 can further aid in scrubbing the articles. Jets of impinging liquid serve as solvents to loosen dirt and other debris upon the articles and further serve to flush such dirt and debris from the articles and from containers 30 and 70 through openings 35 and 76. Articles cleaned within apparatus 10 and 60 are then removed through access doors 40 and 80.

Washing apparatus 10 and 60 are suitable for cleaning rocks, clams and other shellfish, vegetables and fruits such as potatoes, carrots, turnips, kohlrabi, tomatoes, apples and other articles. The toughness of the articles being cleaned may suggest varying flow rates of liquid and associated rotational rates of containers 30 and 70.

One beneficial aspect of the invention is the ease of control in rotational speed possible by appropriately directing the jet of impinging liquid so that unduly forceful tumbling does not cause damage to the articles being cleaned. The inventions are easily used with a typical garden hose and a jet of water directed therefrom.

The apparatus of this invention are advantageously constructed using a wide variety of materials in the forms described above and a wide variety of equivalents thereto. Typical metal, wood and plastic working techniques can obviously be employed to produce such apparatus.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. An apparatus for tumbling and cleaning articles useful in combination with an externally applied jet of liquid directed thereat, comprising;

a frame;

a container mounted for free rotation upon said frame and having an interior volume, said container having perimetric surfaces with a plurality of openings therein at perimetric locations about the container through which the jet of liquid reaches articles contained therein and through which soil, debris and liquid leave the container; and container further having closable access means for allowing articles to be placed into and removed from the interior volume of the container;

fin means attached to the container adjacent circumferential surfaces thereof for being impinged upon by the jet of liquid to thereby rotate the container; and brushing means mounted within the interior volume of said container for contacting and brushing articles being cleaned as the articles tumble within the container as the container is rotated.

2. The apparatus of claim 1 wherein said brushing means comprises brushes mounted stationarily within the container.

3. The apparatus of claim 1 wherein said brushing means are mounted stationarily within the container and further mounted rotatably with the container.

4. The apparatus of claim 1 wherein said brushing means comprises brushes mounted rotatably within the container.

5. The apparatus of claim 1 wherein the perimetric surfaces are made at least partially of reticulated material.

6. The apparatus of claim 1 wherein said container includes two spaced end plates with perimetric surfaces connected therebetween made of at least partially reticulated material.

7. The apparatus of claim 1 wherein said fins are mounted outside the interior volume.

8. The apparatus of claim 1 wherein said fins are mounted at least partially within the interior volume.

9. The apparatus of claim 1 wherein said container is mounted for rotation about an approximately horizontal axis of rotation.

10. The apparatus of claim 1 wherein said container is mounted for rotation about an approximately horizontal longitudinal axis of rotation; and said brushing means include stationarily and rotationally mounted brushes.

11. The apparatus of claim 10 wherein said container is approximately cylindrical and mounted for rotation about a longitudinal axis thereof.

12. The washing apparatus of claim 1 further comprising exterior brushing means mounted to brush contained articles and perimetric surfaces of said container.

13. A washing apparatus for tumbling and cleaning articles in combination with an externally applied jet of water impinging thereon, comprising:

a frame;

a container mounted for free rotation upon the frame about an approximately horizontally oriented longitudinal axis of rotation; said container having two spaced end surfaces and circumferential surfaces extending therebetween; and circumferential surfaces being at least partially formed from reticulated material sized to retain articles being cleaned therein while allowing the jet of water to impinge upon articles contained with the container and allow debris and water to leave from the container;

access door means in said container for allowing articles to be placed therein and removed therefrom;

a plurality of fins mounted between the end surfaces adjacent the circumferential surfaces and adapted to impart rotational motion to the container when impinged upon by the jet of water; and brushing means mounted within the container for contacting and brushing articles tumbling within the container as the container is rotated.

14. The washing apparatus of claim 13 wherein the brushing means includes stationarily and rotationally mounted brushing means.

15. The washing apparatus of claim 13 wherein the container is mounted for rotation about a shaft extending therethrough and having brush means mounted thereon within the container.

* * * * *